No. 628,287. Patented July 4, 1899.
C. C. SMALLEY.
STRAW OR FEED CUTTER.
(Application filed Apr. 29, 1898.)
(No Model.)
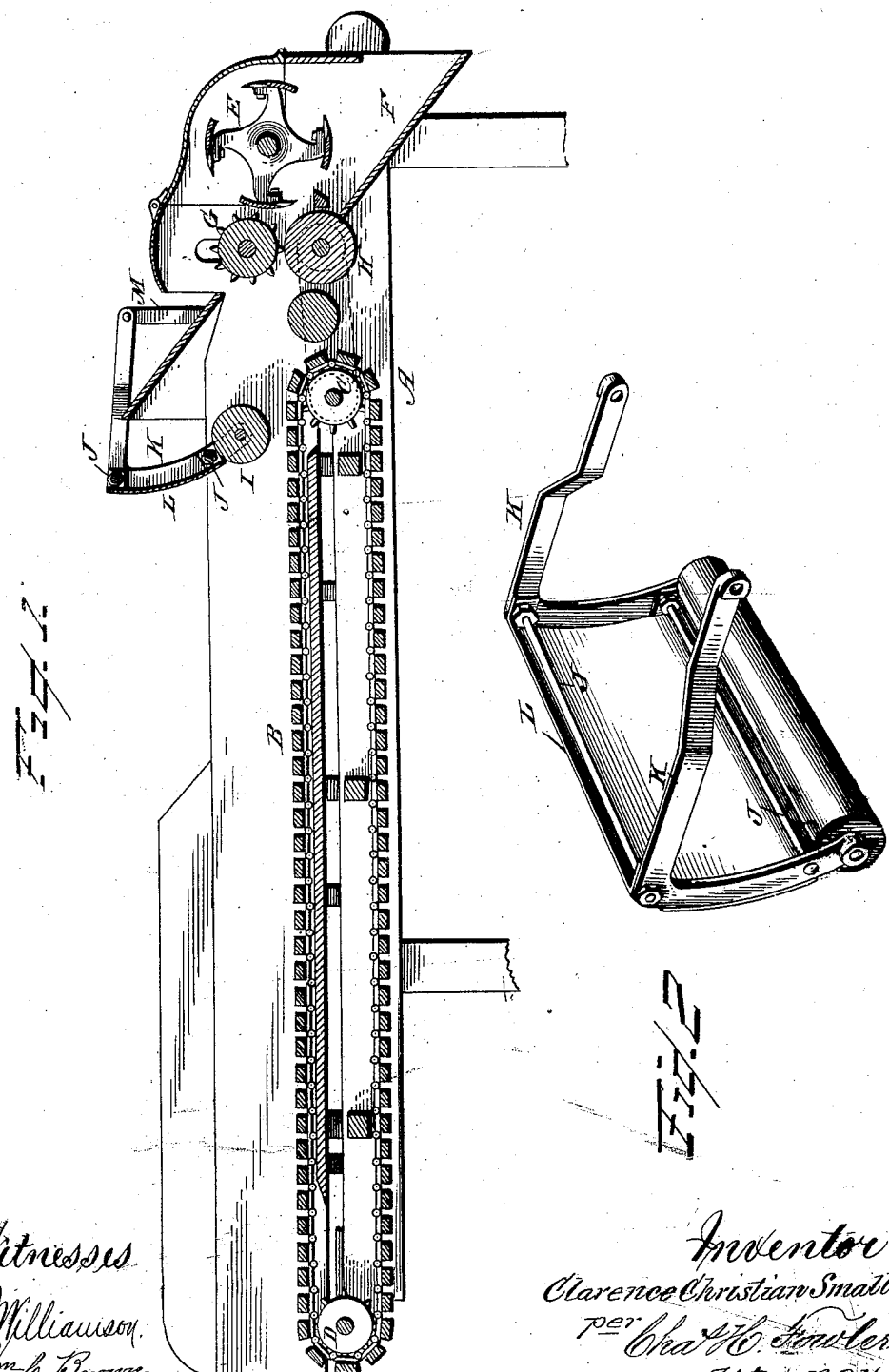

UNITED STATES PATENT OFFICE.

CLARENCE CHRISTIAN SMALLEY, OF MANITOWOC, WISCONSIN, ASSIGNOR TO THE SMALLEY MANUFACTURING COMPANY, OF SAME PLACE.

STRAW OR FEED CUTTER.

SPECIFICATION forming part of Letters Patent No. 628,287, dated July 4, 1899.

Application filed April 29, 1898. Serial No. 679,192. (No model.)

*To all whom it may concern:*

Be it known that I, CLARENCE CHRISTIAN SMALLEY, a citizen of the United States, residing at Manitowoc, in the county of Manitowoc and State of Wisconsin, have invented certain new and useful Improvements in Straw or Feed Cutters; and I do hereby declare that the following is a full, clear, and exact description of the same, reference being had to the annexed drawings, making a part of this specification, and to the letters of reference marked thereon.

The present invention has for its object to provide a straw or feed cutter with an automatically-yielding safety-roller to take the place of the hand of the operator in spreading out the straw or other substance which is compressed before it passes to the main feed-rollers of the machine, thereby acting as a complete safety-guard against the operator's hands being injured by accidentally getting them under the roller.

The invention consists in a device constructed substantially as shown in the drawings and hereinafter described and claimed.

Figure 1 of the drawings represents a longitudinal vertical section of a straw or feed cutter embodying my invention; Fig. 2, a detail view in perspective of the safety-roller and its attachments.

In the accompanying drawings, A represents the frame of the straw or feed cutter, and B the endless carrier engaging with sprocket-wheels C D, the former being connected with the usual mechanism for rotating the same. The frame at one end is provided with the usual chute F and rotatable cutter E and the feed-rollers G H, the upper one of said rollers being made yielding in the usual manner.

The several parts of the machine above referred to may be variously modified or changed as found best adapted to the purpose, this being one of many forms of straw or feed cutters to which my invention is applicable, and therefore do not wish to be understood as confining myself to the construction shown.

The essential feature of the invention resides in the safety-roller I, which may be of metal or wood or of any suitable material that would be considered most suitable. This roller is arranged over the endless carrier B and is journaled to the lower ends of two-armed levers K, connected together by brace-rods J. The upper or horizontal arms of the levers are pivotally connected to suitable standards M, whereby said roller will have an automatically-yielding motion. The rods J not only act as braces to the levers, but serve to connect thereto the guard-plate L, which guard-plate serves a double purpose, in that it prevents the cornstalks or fodder which is being fed to the machine from escaping the roller under which it is to pass, thereby getting to the feed-rollers and cutter in proper shape. The plate also makes an absolute safety-guard for the feeder's hands to prevent the danger of the operator extending his hands beyond the safety-roller I and in contact with the feed-rollers G H. This safety-guard device, comprising the roller I and the guard-plate L and the pivotal connections for the roller, provides a simple and effective element in straw or feed cutters that will prevent the danger to the hands of the operator. If the operator through carelessness gets his hand caught under the roller I, the device being pivoted as hereinbefore described, the same will automatically rise to enable the release of the hand, while the guard-plate L prevents the hand from being brought in contact with the feed-rollers G H.

It will be seen upon reference to Fig. 2 that the guard has at top and bottom lugs, through which pass the brace-rods, the said lugs bearing against the inner faces of the levers, and thus the rods serve not only to brace the levers and hold them at a predetermined distance apart, but also to hold the guard-plate in its position and dispensing with the necessity of other means for this purpose.

Having now fully described my invention, what I claim as new, and desire to secure by Letters Patent, is—

1. In a straw and feed cutter, an endless carrier, standards rising from the frame, levers pivotally mounted at one end on said standards and having substantially vertical portions, a roller journaled in the free ends of said vertical portions, a brace-rod connecting said levers, and a guard-plate secured on the brace-rod between the said levers substantially parallel with the vertical portions thereof, as and for the purpose specified.

2. The combination with the elbow-levers, rods connecting the same at the elbows and also near the free ends of the vertical portions, and a roller journaled in the free ends of the vertical portions, of a guard extending parallel with the vertical portions and having lugs arranged against the inner faces of the levers and held by the brace-rods, as shown and described.

In testimony that I claim the above I have hereunto subscribed my name in the presence of two witnesses.

CLARENCE CHRISTIAN SMALLEY.

Witnesses:
TIMOTHY KELLEY,
LOUIS H. GRIMM.